United States Patent Office 2,889,241
Patented June 2, 1959

2,889,241

PHENOLIC RESIN COMPOSITION AND MEANS FOR CONTROLLING VISCOSITY OF SAME

Thomas A. Gregory and Frederic J. Shelton, Seattle, Wash., assignors to Reichhold Chemicals, Inc., Detroit, Mich.

No Drawing. Application December 13, 1954
Serial No. 475,010

7 Claims. (Cl. 154—133)

The invention relates to an improved adhesive composition primarily suitable for the manufacture of plywood, but also has other important adhesive uses, such as the bonding of paper to veneers and the like. This composition consists of an aqueous phenolic resin thickened by a boron compound, particularly a soluble boron-oxygen compound such as boric acid or a derivative of boric acid.

More particularly our invention is an improvement in the art of plywood adhesives whereby an alkaline aqueous phenolic resin solution is mixed with a suitable fibrous extender and treated with a small amount of boric acid or boric acid derivative whereby the viscosity of the resin and the resin-extender mixture is increased. The ability to endure long assembly times is improved and the flow characteristic of the adhesive mixture during the bonding of plywood is improved.

When we speak of phenolic resin we include all autogenous thermosetting resins made from phenol, its homologs or mixtures thereof condensed in the major part not only with an aldehyde such as formaldehyde, acetaldehyde or the like, but also with other condensing agents such as ketones. The term "ketaldone" has been used to designate both aldehydes and ketones, as for instance in Patent No. 2,111,226. Such resins may be initially condensed either at an alkaline or acid pH. If the resins are acid catalyzed they must be rendered alkaline by the addition of an alkali metal hydroxide or basic salt thereof in order to be water soluble.

It is desirable in the manufacture of plywood to be able to control the viscosity of the adhesive mixture as applied to veneer being bonded. Variations in mixing conditions, such as temperature, rate of agitation and equipment variations produce different adhesive mix viscosities with constant materials and otherwise constant mixing procedure. It is further desirable that the resin being used have a low viscosity for ease in handling and to obtain the maximum possible storage life. In using our process we utilize a resin solution having relatively low viscosity to achieve the aforementioned aims and then add a soluble boron compound such as boric acid derivative or boric acid during the mixing of the adhesive prior to use in the manufacture of plywood.

The increase in viscosity brought about by the addition of a boron-oxygen compound such as boric acid or boric acid derivative to a phenolic resin is largely a function of the amount of the boron-oxygen compound added.

By boric acid or its derivative we include boric acid, sodium tetraborate, potassium metaborate, ammonium borate and the like. These materials are substantially equivalent on an anhydrous boron oxide basis. We prefer to use sodium tetraborate decahydrate because of its availability and cheapness.

The effect of the boron-oxygen compounds such as boric acid or its derivatives on the viscosity of a phenol-aldehyde resin is useful over a wide range of phenol-aldehyde mole ratios. While resins having a mole ratio of between 1.5 and 3.0 moles of formaldehyde per mole of phenol are useful as plywood adhesives we do not wish to be restricted by this range since the increase in viscosity is observable and useful at lower ratios.

The effect of boric acid or its derivatives on the viscosity of a phenolic resin is useful with a wide variety of resins which may employ any of the usual alkaline catalysts, such as sodium hydroxide, potassium hydroxide, ammonium hydroxide, sodium carbonate or barium hydroxide. Such catalysts may be used in quantity from about 0.2 to 1.0 mole of catalyst expressed on an anhydrous basis to 1 mole of phenol.

Useful adhesives for the manufacture of plywood may employ resins having a solids content from about 20% to 75%, and the use of a boric acid derivative with the resins of this range of solids content has proven most useful.

It will be understood that in accordance with the present invention we are not concerned with initially forming phenolic resins using boron compounds as catalysts, but are concerned with the treatment of already formed resins which have been heat reacted to a certain degree of viscosity, preferably substantially within the range of 50 cps. to 3400 cps. at 25° C. with boron compounds as herein set forth, to substantially increase the viscosity of the resins and render them more suitable for use in plywood manufacture.

We have found that the viscosity of the phenolic resin prior to the addition of the boron-oxygen compound has a critical effect upon the resulting viscosity of the admixture. In general, the higher the initial viscosity of the resin the greater is the effect of a constant addition of the boron-oxygen compound. For instance, where a resin has an initial viscosity of 50 cps. at 25° C. the addition of 10% by weight based upon the resin solids of sodium tetraborate decahydrate will increase the viscosity of the mixture to about 400 cps. at 25° C. This may be contrasted to the effect on a resin of higher viscosity. With a resin having an initial viscosity of about 3,400 cps. at 25° C. the addition of 10% by weight based upon the resin solids of sodium tetraborate decahydrate will cause spontaneous gelation of the resin solution. The addition of 0.1% by weight based upon the resin solids of sodium tetraborate decahydrate will cause an increase to a viscosity of about 50,000 cps. at 25° C. with the same resin. It is thus apparent that by control of the concentration of sodium tetraborate decahydrate between 0.1 and 10% by weight of the resin solids any viscosity between about 400 and 50,000 cps. at 25° C. may be obtained. We have found that the increase in viscosity brought about by the addition of a boric acid derivative to a phenol-aldehyde resin is dependent upon the amount of alkaline catalyst present in the resin. In general the higher the concentration of the alkaline catalyst present the less is the effect of the boron-oxygen compound in increasing the viscosity.

In the commercial application of our invention the thickened phenolic resin is generally combined with a cheaper filler or extender material for the purpose of reducing the cost of the adhesive. Typical fillers are those passing through at least a 100 mesh screen and may be wood flour, walnut shell flour, fir bark flour, the residue from furfural manufacture from corn cobs and the like. These fillers may be treated with swelling alkalies with or without the addition of heat prior to the resin addition, if desired.

The invention will be more readily understood by reference to the accompanying specific examples which are intended as illustrative only rather than as limiting the invention to the particular details set forth therein.

In the following examples all viscosity determinations, unless otherwise specified, were made with a Brookfield Viscometer with the appropriate spindle and speed com-

Example I

The following illustrates the thickening effect of a boric acid derivative on a 48.5% non-volatile content aqueous phenol-formaldehyde resin.

A phenolic resin was prepared in a conventional 5 liter glass reaction flask equipped with a mechanical stirrer reflux condenser, cooling and heating means and a thermometer, as follows:

To the flask with continuous agitation were added in the following order a premix consisting of 162.5 grams of water, 12½ grams of sodium hydroxide, and 2.0 grams of hydroxyethylcellulose. (Natrosol obtained from the Hercules Powder Company, Wilmington, Delaware. This product had a viscosity of 3,000 cps. when measured at a 5% concentration and 7% sodium hydroxide solution.) This premix was thoroughly stirred and allowed to stand one hour before adding to the flask. 1,000 grams of U.S.P. phenol were added to the flask, 1,812 grams of 37% formaldehyde solution (methanol content less than 1% and formic acid less than 0.02%) were added with thorough stirring. 350 grams of 49.6% technical grade sodium hydroxide solution were slowly added while carefully maintaining the temperature below 40° C. The exothermic heat of reaction was used to increase the reaction mass temperature to 60° C. in seventeen minutes, and held at this temperature for thirty minutes. Additional heat was applied, raising the temperature to 85° C. within forty-five minutes and the reaction mass was held at this temperature until a removed sample cooled to 25° C. had a viscosity of J to L on the Gardner-Holdt scale. At this time the batch was cooled to 80° C. and held at this temperature until the viscosity of a removed sample cooled to 25° C. was P to Q on the Gardner-Holdt scale. At this point the batch was further cooled to 60° C. and 25 grams of 49.6% sodium hydroxide solution were added and the batch was held at 60° C. until the viscosity of a removed sample cooled to 25° C. was Y to Z on the Gardner-Holdt scale. At this point the batch was cooled to 20° C. in about one hour. The resulting product had a viscosity of 2,300 cps. at 25° C.

To portions of this resin a 16% solution of C.P. sodium tetraborate ($Na_2B_4O_7 \cdot 10H_2O$) was added to give from 0 to 2.5% by weight sodium tetraborate based upon the resin solids. Since the sodium tetraborate was added from a water solution, in the higher concentrations of sodium tetraborate the quantity of water and the resulting dilution was appreciable. For comparison of the viscosity changes the thickened resin viscosity was compared to the viscosity of diluted resin. The diluted resin had the same quantity of water added as the thickened resin. The viscosities of the thickened and diluted resins were as follows:

| Percent By Weight $Na_2B_4O_7 \cdot 10H_2O$ | Viscosity of Diluted Resin, cps. | Viscosity of Mixture, cps. |
| --- | --- | --- |
| 0 | 2,300 | |
| 0.5 | 1,600 | 3,600 |
| 1.0 | 1,280 | 5,200 |
| 2.5 | 600 | 130,000 |
| 5.0 | 300 | gel |

Example II

A resin was prepared in the equipment of Example I as follows:

To the flask with continuous agitation were added in the following order, 1,000 grams of U.S.P. phenol, 936 grams of water, 1,775 grams of 37% formaldehyde solution, and 379 grams of 49.6% sodium hydroxide solution. This mixture was heated to 100° C. in one hundred minutes and maintained at reflux until the viscosity of a sample, removed and cooled to 25° C., was 50 cps. At this point the temperature was reduced to 72° in one hundred forty-two minutes and then 89 grams of 49.6% sodium hydroxide solution were added and the temperature increased to 75° C. in five minutes, and held at 75° C. for forty minutes. 193 grams of 49.6% sodium hydroxide solution were added and the temperature increased to 80° C. and held for fifty-five minutes. The batch was then cooled to 25° C. in thirty minutes and the resulting resin had a viscosity of 490 cps. at 25° C., a non-volatile content of 41.9% and was ready for treatment in our viscosity increasing process. Adhesive mixes were prepared from this resin by taking 500 grams of the above prepared resin solution, 100 grams of Furafil 100-S (finely comminuted residue from the manufacture of furfural from corn cobs obtained from the Quaker Oats Company, Chicago, Illinois) and 100 grams of water in which varying quantities of sodium tetraborate decahydrate had been dissolved. The quantities of sodium tetraborate decahydrate used varied from 0 to 10.45 grams which is from 0 to 5% by weight of the resin solids present. The following table shows the thickening effect of increasing concentrations of sodium tetraborate decahydrate:

| Percent Sodium Tetraborate Decahydrate | Initial Viscosity of Adhesive Mix | Viscosity of Adhesive Mix after Standing 1 hour |
| --- | --- | --- |
| 0 | 408 | 428 |
| 1 | 880 | 1,040 |
| 3 | 4,800 | 5,400 |
| 5 | 19,200 | 44,000 |

Plywood was made with the mixtures and contrasted with the standard containing no borate. The plywood was 13/16″ five ply construction made with 1/8″ Douglas fir face veneer and back veneer and 3/16″ Douglas fir cross band veneer and center core veneer. A glue spread of 65 pounds per thousands square feet of double glue line was used and the assemblies allowed to stand fifteen minutes prior to hot pressing at 285° F. and 200 p.s.i. for seven and one-half minutes. The plywood produced from the mixtures containing sodium tetraborate decahydrate was equivalent to the standard and met the requirement for exterior type plywood when treated according to the procedure outlined in Commercial Standard 45–48, page 3, paragraph 10.

The invention has been described in detail for the purpose of illustration but it will be obvious that numerous modifications and variations may be resorted to within the scope of the appended claims without departing from the spirit of the invention.

We claim:

1. An adhesive composition comprising an aqueous alkaline thermosetting phenol formaldehyde resin solution containing .2–1 mol of an alkaline condensation catalyst per mol of phenol, having its viscosity increased by the addition to the already formed resin of a thickening agent comprising boron-oxygen compound selected from a group consisting of boric acid and its alkali metal and ammonium salts, in proportion of .1–10% by weight based on the weight of the resin solids, the initial phenol formaldehyde resin having been heat reacted to a viscosity substantially within the range of 50–3400 cps. at 25° C. prior to the addition of the thickening agent, and the quantity of thickening agent being in inverse proportion to the viscosity and insufficient to completely neutralize the alkalinity of the composition.

2. An adhesive composition as set forth in claim 1 including a fibrous extender.

3. A process for producing a resinous composition suitable for use for adhesive purposes, which comprises adding to an already formed aqueous alkaline thermosetting phenol formaldehyde resinous solution containing .2-1 mol of an alkaline condensation catalyst, a thickening agent comprising mild boron-oxygen compound selected from a group consisting of boric acid and its alkali metal and ammonium salts to increase the viscosity of the resinous solution in the proportion of .1 to 10% by weight of the boron compound based on the weight of the resin solids, the initial phenol formaldehyde resin having been heat reacted to a viscosity substantially within the range of 50-3400 cps. at 25° C. prior to the addition of the thickening agent, and the quantity of thickening agent being in inverse proportion to the viscosity and insufficient to completely neutralize the alkalinity of the composition.

4. A process as set forth in claim 3, wherein the resinous solution is admixed with a fibrous extender in addition to the boron-oxygen compound.

5. A process for the manufacture of laminated products which comprises applying the resin of claim 1 to fibrous layers, assembling the treated layers in superposed position, and hot pressing the assembly to effect consolidation of the layers.

6. A process as set forth in claim 5, wherein the fibrous layers include wood veneer.

7. A process as set forth in claim 5, wherein the assembly is subjected to a temperature of about 285° F. and pressure of about 200 pounds per square inch for about seven and one-half minutes.

References Cited in the file of this patent

UNITED STATES PATENTS

| | | |
|---|---|---|
| 2,235,193 | Balz | Mar. 18, 1941 |
| 2,338,430 | Habraschka | Jan. 4, 1944 |
| 2,413,624 | Harris | Dec. 31, 1946 |
| 2,414,415 | Rhodes | Jan. 14, 1947 |
| 2,437,710 | Rhodes | Mar. 16, 1948 |
| 2,462,253 | Booty | Feb. 22, 1949 |
| 2,621,165 | Brown | Dec. 9, 1952 |
| 2,631,098 | Redfern | Mar. 10, 1953 |
| 2,667,466 | Nagy | Jan. 26, 1954 |